(12) United States Patent
Basala et al.

(10) Patent No.: US 12,535,097 B2
(45) Date of Patent: Jan. 27, 2026

(54) SELF-ADJUSTING HOOK ASSEMBLY AND METHOD

(71) Applicant: The Boeing Company, Arlington, VA (US)

(72) Inventors: Michael J. Basala, Charleston, SC (US); Jonathan M. Steiner, Johns Island, SC (US); Alexander R. Ocasio, Mount Pleasant, SC (US); Matthew J. Senesac, Charleston, SC (US)

(73) Assignee: The Boeing Company, Arlington, VA (US)

( * ) Notice: Subject to any disclaimer, the term of this patent is extended or adjusted under 35 U.S.C. 154(b) by 225 days.

(21) Appl. No.: 18/306,571

(22) Filed: Apr. 25, 2023

(65) Prior Publication Data

US 2024/0360866 A1    Oct. 31, 2024

(51) Int. Cl.
    *F16B 45/02* (2006.01)
(52) U.S. Cl.
    CPC .................................. *F16B 45/02* (2013.01)
(58) Field of Classification Search
    CPC .. F16B 45/02; F16B 45/00; F16B 5/07; F16B 5/00; B64D 29/06
    See application file for complete search history.

(56) References Cited

U.S. PATENT DOCUMENTS

| | | | | | |
|---|---|---|---|---|---|
| 1,646,546 | A | * | 10/1927 | Larsen | F16G 15/06 294/82.35 |
| 2,375,719 | A | * | 5/1945 | Wirkkala | B66C 1/34 294/82.11 |
| 2,454,257 | A | * | 11/1948 | Rowe | B64C 25/68 244/110 R |
| 2,990,573 | A | * | 7/1961 | Pitts | A22C 21/0007 452/188 |
| 3,654,941 | A | * | 4/1972 | Dillon | A22B 7/001 134/32 |
| 3,910,669 | A | | 10/1975 | Macmaster | |
| 3,981,517 | A | * | 9/1976 | Crochet, Sr. | B60D 1/26 280/478.1 |
| 4,130,260 | A | | 12/1978 | Poe | |
| 4,167,108 | A | * | 9/1979 | Jarman | B21D 1/12 24/601.5 |
| 4,478,446 | A | | 10/1984 | Duran | |

(Continued)

*Primary Examiner* — David M Upchurch
(74) *Attorney, Agent, or Firm* — Kunzler Bean & Adamson

(57) ABSTRACT

A self-adjusting hook assembly is disclosed. The hook assembly comprises a hanger pin apparatus fixed to a first structure and a hook fixed to a second structure. The hanger pin apparatus comprises a keeper that is selectively moveable, relative to a housing. A spring is at least partially enclosed by a bell, and rearward of the housing on along a rod length of a rod member of the keeper. The spring is compressed or expanded to co-move the keeper and the bell, relative to the housing. The hanger pin apparatus is changeable between, and inclusive of, an open state and a closed-loaded state. When in the open state, the spring applies a spring force in a first direction such that the bell is spaced apart from the housing along a rod length of the rod member of the keeper. When in the closed-loaded state, a hook force is applied in a second direction, opposite of the first direction, such that the bell is in contact with the housing along the rod length of the rod member of the keeper.

20 Claims, 11 Drawing Sheets

(56) References Cited

U.S. PATENT DOCUMENTS

| | | | |
|---|---|---|---|
| 4,906,037 A | | 3/1990 | Stammreich et al. |
| 10,450,090 B1* | | 10/2019 | Scott ........................ B60D 1/04 |
| 2012/0151724 A1* | | 6/2012 | Defrance .............. E05C 19/145 |
| | | | 24/601.5 |
| 2012/0159987 A1* | | 6/2012 | Walchle .................. F16B 45/00 |
| | | | 63/3.2 |
| 2015/0345539 A1* | | 12/2015 | Servais ................ F16B 45/023 |
| | | | 24/599.1 |
| 2018/0195325 A1* | | 7/2018 | Amante .................. B64C 27/04 |
| 2018/0274631 A1* | | 9/2018 | Betzler .................. F16G 15/06 |
| 2018/0328397 A1* | | 11/2018 | Hernandez ........... B64D 11/003 |
| 2019/0218072 A1* | | 7/2019 | Maassen ................... B66C 1/34 |
| 2021/0381644 A1* | | 12/2021 | Comstock ............. F16B 45/047 |
| 2023/0322399 A1* | | 10/2023 | Mcmahan ............. E05C 19/145 |
| 2024/0125157 A1* | | 4/2024 | Renard ................. B64D 29/06 |

\* cited by examiner

SELF-ADJUSTING HOOK ASSEMBLY AND METHOD

FIELD

This disclosure relates generally to a hook assembly, and more particularly to a self-adjusting hook assembly and associated methods.

BACKGROUND

Latching mechanisms are widely used in various industries, including the aircraft industry, to securely connect two surfaces. In the aircraft industry, these mechanisms, such as hook assemblies, must withstand significant forces, including vibrations, and maintain their locking positions reliably. Hook assemblies consist of a hook or latch secured to a hatch door or other aircraft component and is engageable with a pin on an opposing surface. Adjustability helps to ensure the hook securely fastens to the pin. However, conventional hook assemblies rely on fixed pin and hook connections and require manual adjustment. Furthermore, manually adjusted hook assemblies do not guarantee intimate contact between the hook and pin. Moreover, access to hook assemblies can be limited, necessitating navigation through access panels or openings for manual adjustments. Additionally, in instances where multiple hook assemblies are required, adjusting the assemblies for uniform and adequate hook force distribution can require frequent attention and adjustment.

SUMMARY

The subject matter of the present application has been developed in response to the present state of the art, and in particular, in response to the problems of and needs created, or not yet fully solved, by conventional hook assemblies and methods. Generally, the subject matter of the present application has been developed to provide a hook assembly, and associated methods, that overcome at least some of the above-discussed shortcomings of prior art techniques.

Disclosed herein is a hanger pin apparatus for a hook assembly. The hanger pin apparatus includes a pin body including a pin-connection member and a rod member that extends from the pin-connection member and has a rod length. The hanger pin apparatus also includes a pin coupled to the pin-connection member of the pin body. The hanger pin apparatus further includes a housing concentric with the rod member of the pin body along a portion of the rod length and comprising a first housing end, adjacent to the pin-connection member of the pin body, and a second housing end. The pin body is selectively movable relative to the housing. The hanger pin apparatus also includes a spring concentric with the rod member of the pin body along a portion of the rod length rearward of the second housing end. The pin body additionally includes a bell concentric with the rod member of the pin body and the spring along a portion of the rod length rearward of the second housing end. The bell at least partially encloses the spring, and the bell is fixed, relative to the pin body, such that the bell co-moves with the pin body relative to the housing. The hanger pin apparatus is changeable between, and inclusive of, an open state and a closed-loaded state. When in the open state, the spring applies a spring force in a first direction such that the bell is spaced apart from the second housing end along the rod length of the rod member of the pin body. When in the closed-loaded state, a hook force is applied in a second direction, opposite of the first direction, such that the bell is in contact with the second housing end along the rod length of the rod member of the pin body. The preceding subject matter of this paragraph characterizes example 1 of the present disclosure.

The pin and the pin body together form a single unitary construction. The preceding subject matter of this paragraph characterizes example 2 of the present disclosure, wherein example 2 also includes the subject matter according to example 1, above.

The pin is removably coupled to the pin body such that the pin is removable from the pin body when the hanger pin apparatus is in the open state. The preceding subject matter of this paragraph characterizes example 3 of the present disclosure, wherein example 3 also includes the subject matter according to any of examples 1-2, above.

The spring is at least one of a belleville spring, a helical spring, a leaf spring, or a torsional spring. The preceding subject matter of this paragraph characterizes example 4 of the present disclosure, wherein example 4 also includes the subject matter according to any of examples 1-3, above.

The hanger pin apparatus includes a spring shielding disposed between the bell and the spring, and configured to shield a gap between the second housing end and the bell when the second housing end is spaced apart from the bell along the rod length of the rod member of the pin body. The preceding subject matter of this paragraph characterizes example 5 of the present disclosure, wherein example 5 also includes the subject matter according to any of examples 1-4, above.

The housing includes an inner surface that is non-circular and configured to prevent the pin body from rotating, relative to the housing. The preceding subject matter of this paragraph characterizes example 6 of the present disclosure, wherein example 6 also includes the subject matter according to any of examples 1-5, above.

The hanger pin apparatus is changeable into a closed-preloaded state between the open state and the closed-loaded state. When in the closed-preloaded state, the spring applies a spring force in the first direction and a hook force is applied in the second direction, opposite of the first direction, such that the bell is spaced apart from the second housing end along the rod length of the rod member of the pin body and the pin-connection member of the pin body is spaced apart from the first housing end. The preceding subject matter of this paragraph characterizes example 7 of the present disclosure, wherein example 7 also includes the subject matter according to any of examples 1-6, above.

The hanger pin apparatus includes a stopper concentric with and fixed to the rod member of the pin body along a portion of the rod length rearward of the bell. The stopper is configured to prevent the bell from moving, relative to the rod member of the pin body. The preceding subject matter of this paragraph characterizes example 8 of the present disclosure, wherein example 8 also includes the subject matter according to any of examples 1-7, above.

The second housing end includes a flange extending radially outward from an outer surface of the housing. The preceding subject matter of this paragraph characterizes example 9 of the present disclosure, wherein example 9 also includes the subject matter according to any of examples 1-8, above.

A thickness of the rod member of the pin body varies along the rod length of the rod member. The preceding subject matter of this paragraph characterizes example 10 of the present disclosure, wherein example 10 also includes the subject matter according to any of examples 1-9, above.

The housing is fixable within a support structure of a structure. The preceding subject matter of this paragraph characterizes example 11 of the present disclosure, wherein example 11 also includes the subject matter according to any of examples 1-10, above.

Further disclosed herein is a hook assembly. The hook assembly includes a hanger pin apparatus fixed to a first structure. The hanger pin apparatus includes a pin body including a pin-connection member and a rod member that extends from the pin-connection member and has a rod length. The hanger pin apparatus also includes a pin coupled to the pin-connection member of the pin body. The hanger pin apparatus further includes a housing concentric with the rod member of the pin body along a portion of the rod length and comprising a first housing end, adjacent to the pin-connection member of the pin body, and a second housing end. The pin body is selectively movable relative to the housing. The hanger pin apparatus also includes a spring concentric with the rod member of the pin body along a portion of the rod length rearward of the second housing end. The hanger pin apparatus further includes a bell concentric with the rod member of the pin body and the spring along a portion of the rod length rearward of the second housing end. The bell at least partially encloses the spring, and the bell is fixed, relative to the pin body, such that the bell co-moves with the pin body, relative to the housing. The hanger pin apparatus is changeable between, and inclusive of, an open state and a closed-loaded state. When in the open state, the spring applies a spring force in a first direction such that the bell is spaced apart from the second housing end along the rod length of the rod member of the pin body. When in the closed-loaded state, a hook force is applied in a second direction, opposite of the first direction, such that the bell is in contact with the second housing end along the rod length of the rod member of the pin body. The hook assembly also includes a hook fixed to a second structure and configured to be removably attachable to the pin. When the hook is attached to the pin, the hook and the pin maintain intimate contact at a pin-hook interface. The preceding subject matter of this paragraph characterizes example 12 of the present disclosure.

The first structure includes a housing support configured to prevent the housing from moving, relative to the pin body. The preceding subject matter of this paragraph characterizes example 13 of the present disclosure, wherein example 13 also includes the subject matter according to example 12, above.

The housing support includes a first support end and a second support end spaced apart from the first support end. The first housing end is laterally aligned with the first support end. The second housing end includes a flange extending radially outward from an outer surface of the housing. The flange extends beyond and abuts against the second support end. The preceding subject matter of this paragraph characterizes example 14 of the present disclosure, wherein example 14 also includes the subject matter according to any of examples 12-13, above.

When the hanger pin apparatus is in the open state, the hook is not attached to the pin. The preceding subject matter of this paragraph characterizes example 15 of the present disclosure, wherein example 15 also includes the subject matter according to any of examples 12-14, above.

When the hanger pin apparatus is in the closed-loaded state, the hook is attached to the pin and the first structure is in a second position, relative to the second structure. The preceding subject matter of this paragraph characterizes example 16 of the present disclosure, wherein example 16 also includes the subject matter according to any of examples 12-15, above.

The hanger pin apparatus is changeable into a closed-preloaded state between the open state and the closed-loaded state. When the hanger pin apparatus is in the closed-preloaded state, the spring applies a spring force in the first direction and the hook applies a hook force in the second direction, opposite of the first direction such that the bell is spaced apart from the second housing end along the rod length of the rod member of the pin body and the pin-connection member of the pin body is spaced apart from the first housing end. The preceding subject matter of this paragraph characterizes example 17 of the present disclosure, wherein example 17 also includes the subject matter according to any of examples 12-16, above.

When the hanger pin apparatus is in the closed-preloaded state, the hook is attached to the pin and the first structure is in a first position, relative to the second structure. The preceding subject matter of this paragraph characterizes example 18 of the present disclosure, wherein example 18 also includes the subject matter according to example 17, above.

The first structure is a fan cowl of an aircraft. The second structure is a strut of the aircraft. The preceding subject matter of this paragraph characterizes example 19 of the present disclosure, wherein example 19 also includes the subject matter according to any of examples 12-18, above.

Further disclosed herein is a method of maintaining intimate contact between a pin and a hook at a pin-hook interface, when attached, via a hook assembly. The method includes locating the pin of a hanger pin apparatus, fixed to the first structure, adjacent to the hook, fixed to the second structure. The hanger pin apparatus comprising a housing, a spring and a bell along a rod length of a pin body. The pin, coupled to the pin body, is selectively movable, relative to the housing via the spring and the bell. When locating the pin adjacent to the hook, the hanger pin apparatus is in an open state, such that the spring is applying a spring force in a first direction so that the bell is spaced apart from the housing. The method also includes attaching the hook to the pin of the hanger pin apparatus. After attachment of the hook and the pin, the first structure is in a first position relative to the second structure and the hook and the pin are maintained in intimate contact at the pin-hook interface. Additionally, after attachment of the hook and the pin, the hanger pin apparatus is in a closed-preloaded state, such that the spring is applying a spring force in the first direction and the hook is applying a hook force in a second direction, opposite of the first direction so that the housing is spaced apart from the bell and a pin-connection member of the hanger pin apparatus. The method further includes displacing the first structure from the first position to the second position, relative to the second structure while the hook and the pin are maintained in intimate contact at the pin-hook interface. After displacement of the first structure to a second position, the hanger pin apparatus is in a closed-loaded state, such that the hook is applying a hook force in the second direction so that the bell is in contact with the housing. The preceding subject matter of this paragraph characterizes example 20 of the present disclosure.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the subject matter of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the subject matter of the present disclosure, however, absent an express correlation to indicate otherwise, an implementation may be associated with one or more examples.

Disclosed herein are examples of a hanger pin apparatus for a hook assembly and associated methods of maintaining intimate contact between a pin and a hook of the hook assembly, when engaged. The following provides some features of at least some examples of the hanger pin apparatus. The hanger pin apparatus includes a pin, coupled to a pin body, and collectively referred to as a keeper, to which a hook is configured to be engageable with. After engagement of the hook and pin, intimate contact is maintained at a pin-hook interface between the hook and pin. As used herein, intimate contact refers to a close and tight connection between two surfaces, such that there are no significant gaps or spaces between the two surfaces (e.g., significant gaps can be gaps other than those created by the surface roughness of the mating surfaces). Intimate contact is important for maintaining a secure and stable connection between the hook and the pin. Intimate contact between the hook and the pin is maintained by the hanger pin apparatus, which is self-adjustable. That is, the keeper is translationally movable, relative to a structure to maintain the intimate contact between the hook and pin. This movement is enabled by the self-adjusting ability of the hanger pin apparatus, which automatically adjusts (i.e., floats) the position of the keeper between a closed-preloaded state and a closed-loaded state. This is accomplished by using a spring that applies force in a first direction and compresses when a hook force is applied in a second direction, opposite of the first direction. The hanger pin apparatus's self-adjusting ability eliminates the need for rigging procedures typically required by conventional latch mechanisms to account for tolerances and loading displacements.

Figure 1:
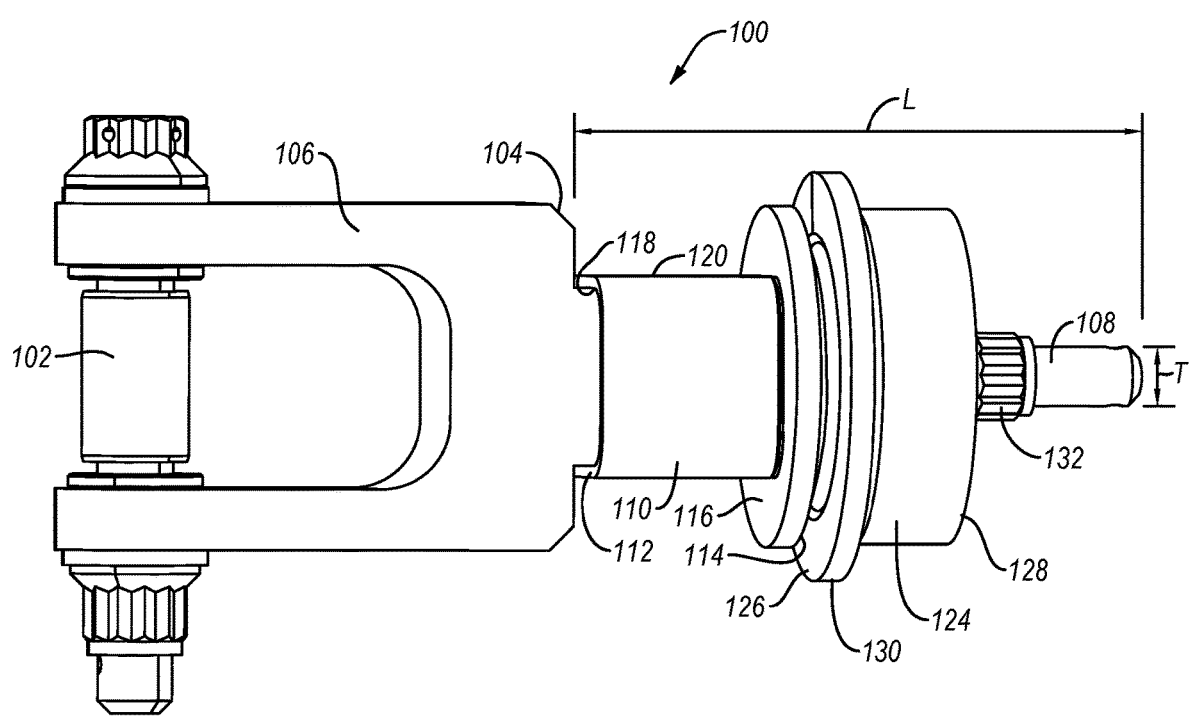
FIG. 1 is a schematic perspective view of a hanger pin apparatus, according to one or more examples of the present disclosure.
Figure 2:
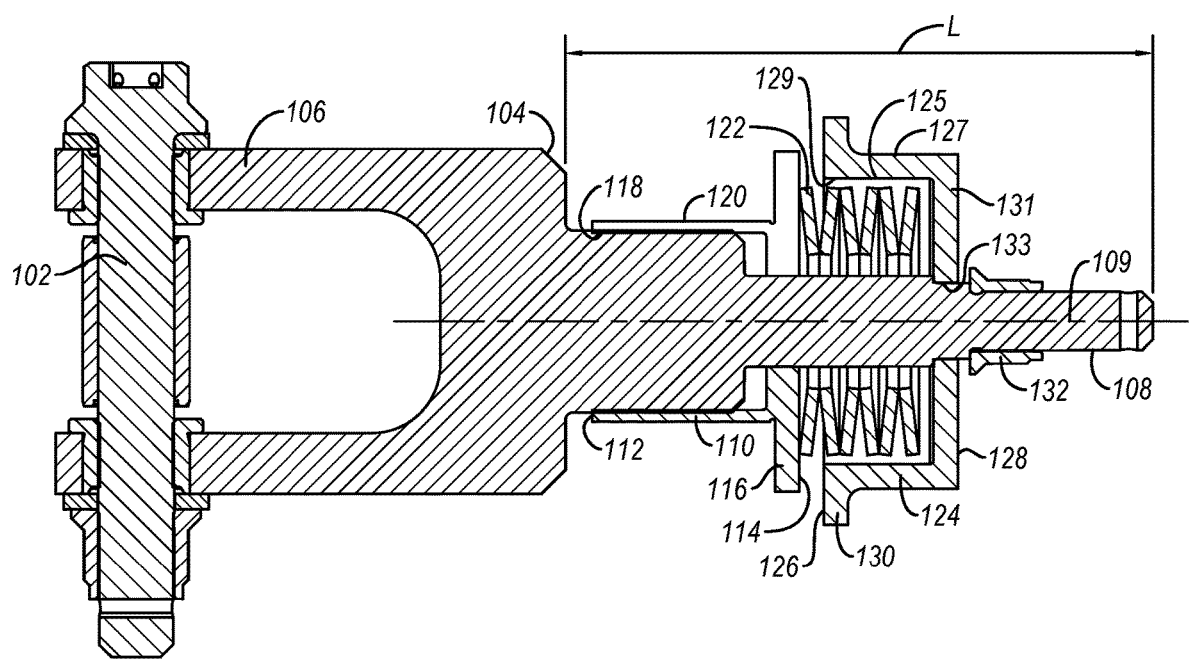
FIG. 2 is a schematic cross-sectional view of the hanger pin apparatus of FIG. 1, according to one or more examples of the present disclosure.

Referring to FIGS. 1 and 2, one example of a hanger pin apparatus 100 is shown. The hanger pin apparatus 100 includes a pin body 104 having a pin-connection member 106 and a rod member 108 that extends from the pin-connection member 106. A pin 102 is coupleable to the pin-connection member 106. The pin 102 and the pin body 104, when coupled together, form what is referred to as the keeper 105. For simplicity, the terms pin body 104 and keeper 105 may, in some cases, be used interchangeably in this description. In some examples, the pin-connection member 106 is U-shaped having two arms to which the pin 102 is coupleable (e.g., the pin 102 extends between and through the two arms). In other examples, the pin-connection member 106 is V-shaped, or otherwise shaped with two arms to which the pin 102 is coupleable. The rod member 108, extending from the pin-connection member 106, defines a center axis 109 along which the rod member 108 is elongated, such that the rod member 108 has a rod length (L). The rod member 108 has a thickness (T) defined as the minimum distance from one side of the rod member 108 to an opposite side of the rod member 108 (e.g., diameter) at a point along the length (L) of the rod member 108. The thickness (T) of the rod member 108 can vary at different locations along the length (L) of the rod member 108. In other words, in a direction along the length (L) of the rod member 108, the thickness (T) of the rod member 108 can vary. In some examples, the rod member 108 is cylindrical, such that the cross-section at a point along the length (L) of the rod member 108 is circular. In other examples, the rod member 108 has various cross-sectional shapes at different points along the length (L) of the rod member 108, such that at least a portion of the length (L) of the rod member 108 is non-cylindrical.

The pin 102 is an elongated cylindrical element that is coupleable to the pin-connection member 106. In some examples, the pin 102 is coupled to the pin-connection member 106 in such a way as to be rotatable, relative to the pin-connection member 106. In other examples, the pin 102 is fixed, such that the pin 102 does not move relative to the pin-connection member 106. The pin 102 may include various coupling features, such as threads, ridges, or grooves to secure the pin 102 to the pin-connection member 106. In some examples, the pin 102 is removable from the pin-connection member 106 via the coupling features. This allows the pin 102 to be removed and replaced when the pin 102 is worn or damaged without needing to replace the entire hanger pin apparatus 100. In other examples, the pin 102 and the pin body 104 together from a single unitary construction. In other words, the pin 102 and the pin body 104 are formed from a single material with no seams or movable parts, rather than being produced as separate parts that are joined together. The one-piece construction may provide the keeper 105 with greater durability and structural integrity due to the absence of joints or seams. Additionally, it can simplify the manufacturing process and reduce the number of parts required.

The hanger pin apparatus 100 further includes a housing 110 that is concentric with the rod member 108 of the pin body 104 along a portion of the rod length (L). As used herein, concentric refers to two or more objects that share a common center axis (i.e., center axis 109), with one object surrounding the other object. The two or more objects are, in some cases, circular objects, however in other cases the two or more objects may be other shapes such as rectangular or other non-circular objects. The housing 110 is configured to restrict the movement of the keeper 105 in any direction other than translational movement along the center axis 109. The housing 110 includes an inner surface 118 and an outer surface 120. The inner surface 118 faces toward the rod member 108, while the outer surface 120 faces away from the rod member 108. Correspondingly, the inner surface 118 is concave and the outer surface 120 is convex. The inner surface 118 defines an aperture and is configured to engage with the rod member 108 of the pin body 104. The housing 110 is elongated from a first housing end 112 to a second housing end 114. The first housing end 112 is adjacent to the pin-connection member 106 of the pin body 104, such that the housing 110 is rearward of the pin-connection member 106. In some examples, the housing 110 is cylindrical, such that the inner surface 118 has a circular cross-section along its length. In other examples, the housing 110 is non-cylindrical, such that the inner surface 118 of the housing 110 does not have a circular cross-section along its length. For example, the housing 110 can have a variety of cross-sectional shapes, including square, rectangular, oval, or irregular shapes that do not conform to a perfect cylinder. The housing 110 may have a non-cylindrical shape to prevent the pin body 104 from rotating, relative to the housing 110. The housing may be made of a variety of materials, including metal, plastic, or composite materials.

In some examples, the second housing end 114 includes a flange 116 that extends radially outward from the outer surface 120 of the housing 110. In other words, an outer diameter at the flange 116 is greater than an outer diameter at the first housing end 112. Additionally, in some examples, the flange 116 also extends radially inwardly from the inner surface 118 of the housing 110. In other words, an inner diameter at the flange 116 is less than an inner diameter at the first housing end 112. Therefore, the inner surface 118, defining the aperture that is configured to engage with the rod member 108, has a varying diameter. Accordingly, the thickness (T) of the rod member 108 corresponding with the first housing end 112 is greater than the thickness (T) of the rod member 108 corresponding with the flange 116.

The hanger pin apparatus 100 further includes a spring 122 that is concentric with the rod member 108 of the pin body 104 along a portion of the rod length (L). The spring 122 is rearward of the second housing end 114 along the rod length (L) and configured to compress and expand along the rod member 108, thereby enabling the keeper 105 to move (i.e., self-adjust) translationally, relative to the housing 110. As further described below, the spring 122 is at least partially compressed, that is, there is no complete unloading of the spring 122. As such, the spring 122 remains in contact with the second housing end 114, as shown in FIG. 2 regardless of the position of the keeper 105, relative to the housing 110. Any of a variety of springs can be utilized, including but not limited to a belleville spring, a helical spring, a leaf spring, or a torsional spring.

The hanger pin apparatus 100 further includes a bell 124 that is concentric with the rod member 108 of the pin body 104 along a portion of the rod length (L) rearward of the second housing end 114. Additionally, the bell 124 is concentric with the spring 122 and at least partially encloses the spring 122. In other words, the bell 124 is shaped to at least partially cover the spring 122. The bell 124 is configured to control the compression and expansion of the spring 122. The bell 124 includes an inner surface 125 and an outer surface 127. The inner surface 125 faces toward the spring 122, while the outer surface 127 faces away from the spring 122. Correspondingly, the inner surface 125 is concave and the outer surface 127 is convex. The inner surface 125 defines an opening 129 in which the spring 122 is configured to be at least partially enclosed. The opening 129 is elongated from a first bell end 126 of the inner surface 125 to a second bell end 128 of the inner surface 125. The spring 122 is at least partially compressed and partially within the opening 129, as there are no complete unloading cycles of the spring 122, when the hanger pin apparatus 100 is in use. Accordingly, the spring 122 remains in contact with an inner surface of a terminal wall 131 of the opening 129. The first bell end 126 is adjacent to the second housing end 114, as the bell 124 is rearward of the housing 110. In some examples, the first bell end 126 is in contact with the second housing end 114. Alternatively, in other examples, the first bell end 126 is not in contact with the second housing end 114. As the keeper 105, which co-moves with the bell 124, is self-adjustable, the position of the first bell end 126, relative to the second housing end 114, is changeable.

The bell 124 is cylindrical, such that the inner surface 125 has a circular cross-section along its length. A terminal wall 131 extends radially inwardly from the second bell end 128 and terminating adjacent to the rod member 108, such that the rod member 108 extends from a terminal opening 133 in the terminal wall 131. The center axis 109 is a geometric center of the terminal opening 133, and therefore the geometric center of the bell 124. Accordingly, the diameter of the terminal opening 133 is less than the diameter of the opening 129 of the bell 124. Additionally, in some examples, the thickness (T) of the rod member 108 corresponding to the opening 129 of the bell 124 is the same as the thickness (T) of the rod member 108 corresponding to the terminal opening 133. In other examples, the thickness (T) of the rod member 108 corresponding to the opening 129 of the bell 124 is the greater than the thickness (T) of the rod member 108 corresponding to the terminal opening 133 to prevent the bell 124 from moving forward, relative to the keeper 105.

In some examples, the first bell end 126 includes a flange 130 that extends radially outward from the outer surface 127 of the bell 124. In other words, an outer diameter at the flange 130 is greater than an outer diameter at the second bell end 128. Regardless of whether the first bell end 126 includes the flange 130, the first bell end 126 is configured to selectively contact the second housing end 114 due to the opposing forces from the spring or hook. The bell 124 may be made of a variety of materials, including metal, plastic, or composite materials.

The bell 124 is fixed, relative to the keeper 105, such that the bell 124 co-moves with the keeper 105, relative to the housing 110. In some examples, the bell 124 is directly fixed to the rod member 108 by coupling features on the bell 124 such as threads, ridges, or grooves that secure the bell 124 to the rod member 108. In other examples, the bell 124 is indirectly fixed to the rod member 108 by a stopper 132. The stopper 132 is concentric with the rod member 108 of the pin body 104 and fixed to the rod member 108 along a portion of the rod length (L) rearward of the bell 124. The stopper 132 is configured to prevent the bell 124 from moving, relative to the rod member 108. Specifically, the stopper 132 prevents the bell 124 from moving in a first direction 134, relative to the housing 110 (see, e.g., FIG. 4). The spring 122 prevents the bell 124 from moving in a second direction 136, opposite of the first direction 134, relative to the housing 110. In other words, the stopper 132 and the spring 122 fix the bell 124 to the rod member 108, and the bell 124 and keeper 105 co-move, relative to the housing 110.

Figure 3:
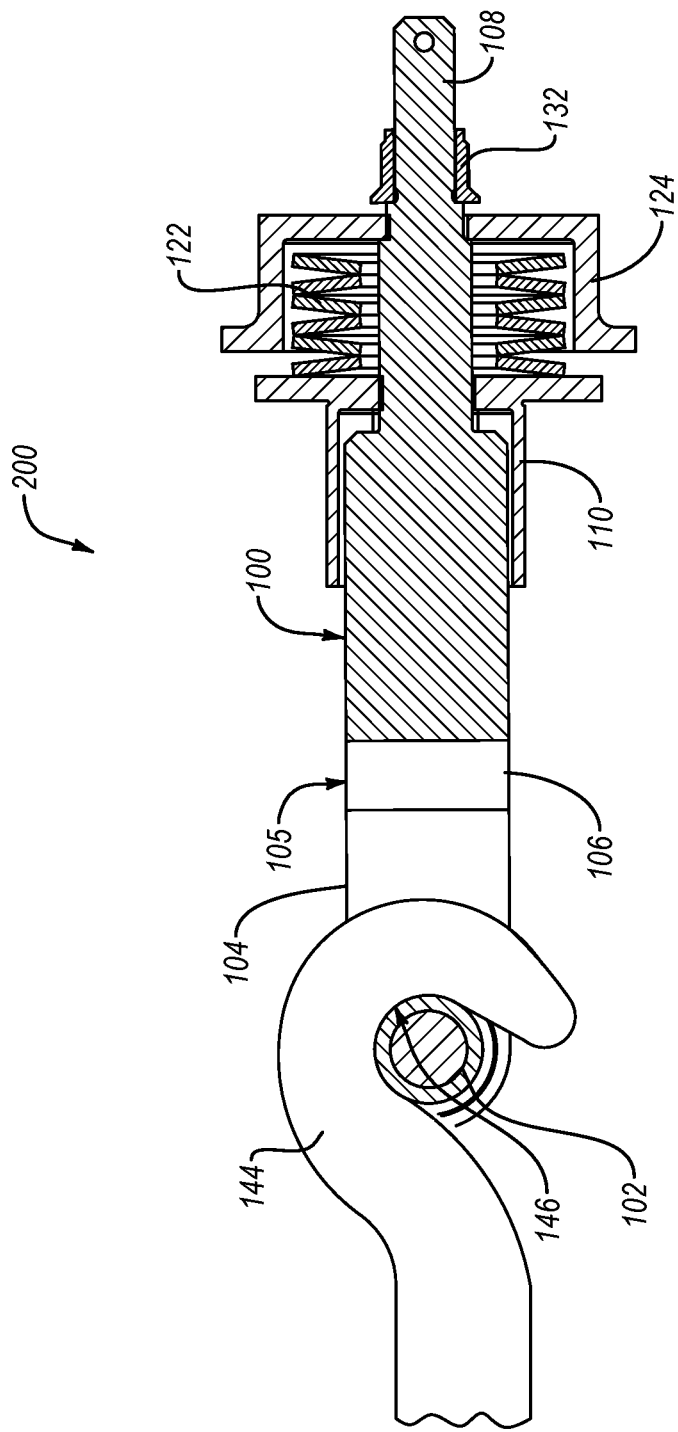
FIG. 3 is a schematic cross-sectional view of a hook assembly, according to one or more examples of the present disclosure.

Referring to FIG. 3, a cross-sectional view of a hook assembly, with a hook attached to a pin, is shown. The hook assembly 200 includes the hanger pin apparatus 100, as described above, and a hook 144. Although not shown, the hanger pin apparatus 100 is fixed to a first structure and the hook is fixed to a second structure. The hook 144 is fixed to the second structure through any attachment means. The hook 144 is configured to be removably attachable to the pin 102 of the hanger pin apparatus 100, such that the hook 144 and hanger pin apparatus 100 are used to latch connect the first structure and the second structure. Additionally, the hook 144 can be rotated about the pin 102, such that the position of the second structure is changeable, relative to the first structure, or visa-versa. After attachment of the hook and pin, intimate contact is maintained at a pin-hook interface 146 between the hook 144 and pin 102. Intimate contact at the pin-hook interface 146 helps to maintain a secure and stable connection between the hook 144 and the pin 102, and therefore the first structure and the second structure, as well as, reduce the wear at the pin-hook interface 146 due to friction.

Figure 4:
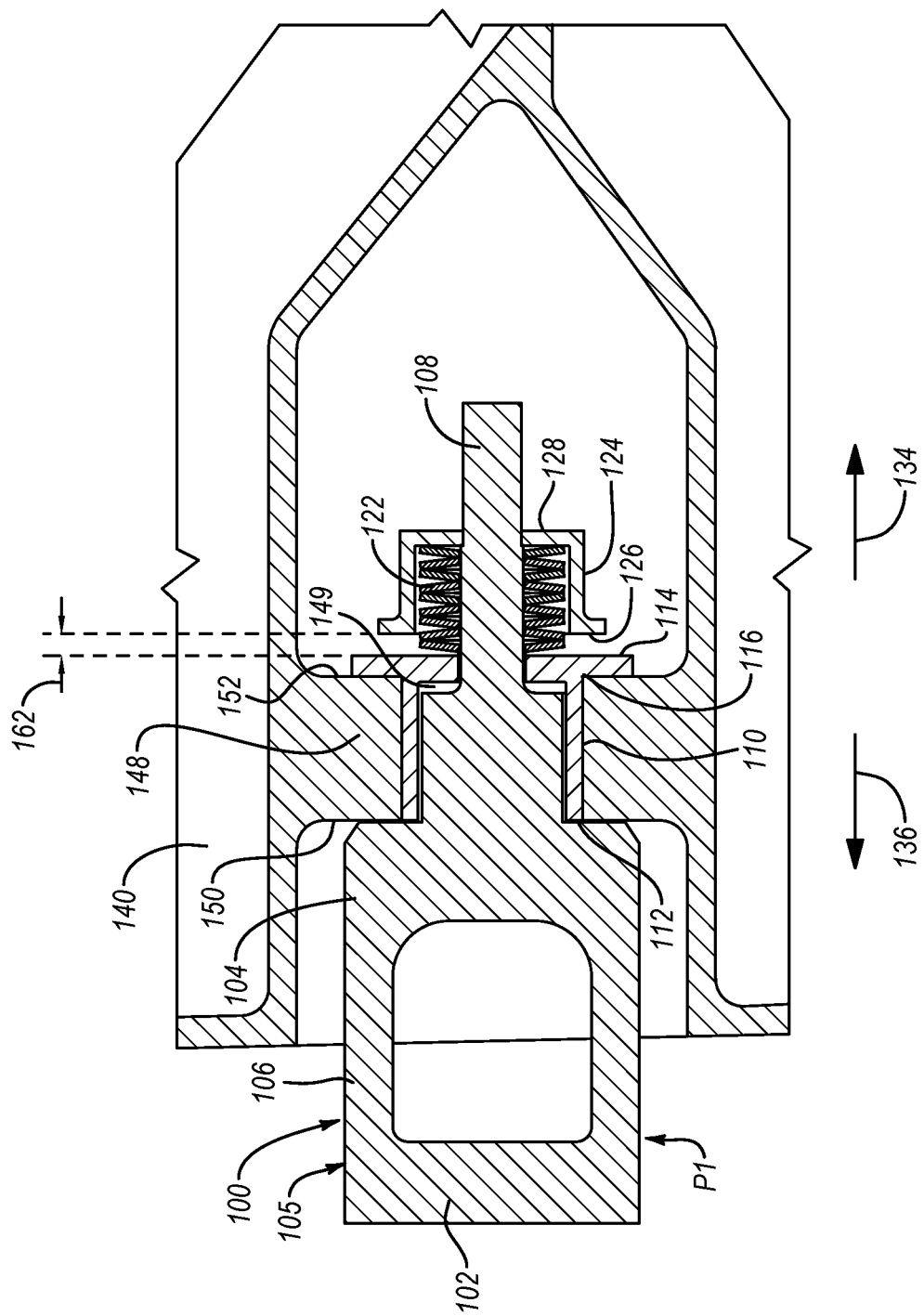
FIG. 4 is a schematic perspective view of a hanger pin apparatus fixed to a first structure, with the hanger pin apparatus in an open state, according to one or more examples of the present disclosure.

Now referring to FIG. 4, a cross-sectional view of the hanger pin apparatus 100 is shown fixed to a first structure 140. The first structure 140 has a housing support 148 that is configured to support and contain the housing 110. The housing support 148 is defined by a first support end 150 and a second support end 152, spaced apart from the first support end 150 and a circumferentially closed sidewall extending from the first support end 150 to the second support end 152. Accordingly, the housing support 148 includes a hollow interior channel 149 that extends the length of the housing support 148. The sidewall of the housing support 148 is configured to mirror the outer surface 120 of the housing 110, such that the housing 110 can be fitted within the housing support 148. In other words, the housing 110 is constrained within the hollow interior channel 149 and prevents the housing 110 from rotating or otherwise moving, relative to the housing support 148. Accordingly, the corresponding geometry of the housing support 148 and the housing 110 traps the housing 110 within the housing support 148 with primary contact only through the housing/housing support interface. For example, the hollow interior channel 149 of the housing support 148 may have a cylindrical or a non-cylindrical shape that corresponds to the shape of the housing 110. In some examples, coupling features may be further added to fix the housing 110 to the housing support 148, such coupling features include but are not limited to adhesive, corresponding notches, screws, bolts, etc.

When the housing 110 is fitted with the housing support 148, the first housing end 112 is laterally aligned with the first support end 150. In some examples, the second housing end 114 is laterally aligned with the second support end 152. In other examples, the second housing end 114 extends beyond the second support end 152. For example, a flange 116 of the housing 110, which extends radially outward from the outer surface 120 of the housing 110 at the second housing end 114, extends beyond the second support end 152 of the housing support 148 and abuts against the second support end 152. That is, when the housing 110 is fitted within the housing support 148, the outer surface 120 is contacting the sidewall of the housing support 148, and the flange 116 of the housing 110 is contacting the second support end 152 of the housing support 148.

Figure 5:
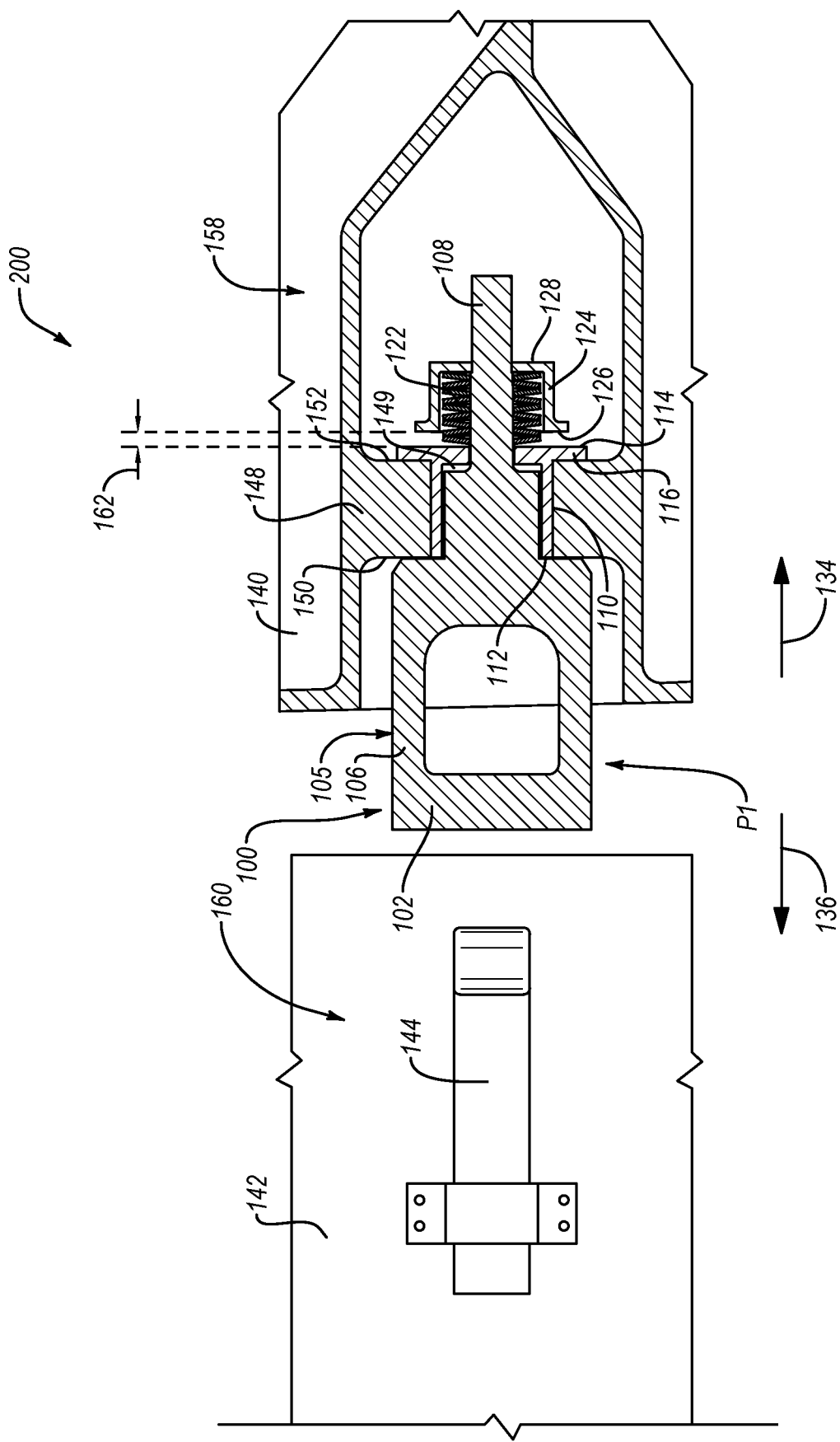
FIG. 5 is a schematic perspective view of a hook assembly, with the hanger pin apparatus of FIG. 4 in an open state, according to one or more examples of the present disclosure.

The hanger pin apparatus 100 in changeable between, and inclusive of, an open state (P1) and a closed-loaded state (P3). As shown in FIGS. 4 and 5, the hanger pin apparatus 100 is in an open state (P1). When in the open state (P1), the spring 122 applies a spring force in a first direction 134. The first direction 134 is perpendicular to the pin 102 and directed in a direction away from the pin 102, such that the spring force pulls and/or maintains the pin 102 proximate to the first structure 140. Applying the spring force in the first direction 134, forces the bell 124 to move in the first direction 134, which consequently moves the keeper 105 in the first direction 134 as the bell 124 and the keeper 105 co-move, relative to the housing 110. Accordingly, the bell 124 is spaced apart from the second housing end 114 along the rod length (L) of the rod member 108 of the keeper 105. In other words, a first gap 162 is between the first bell end 126 and the second housing end 114 when the hanger pin apparatus 100 is in the open state (P1). Additionally, the pin-connection member 106 is in contact with at least one of the first support end 150 or the first housing end 112, when the hanger pin apparatus 100 is in the open state (P1). Accordingly, there is no gap between the pin-connection member 106 and at least one of the first support end 150 or the first housing end 112, such that the keeper 105 is prevented from persisting in the first direction 134. Additionally, the contact between the pin-connection member 106 and at least one of the first support end 150 or the first housing end 112 prevents the spring 122 from expanding to a complete unloading cycle of the spring 122, such that the spring 122 is under compression in the open state (P1). The first gap 162 can be any of various gap sizes depending on the application of the hook assembly 200. In some examples, the first gap 162 is less than one centimeter. In other examples, the first gap 162 is less than five millimeters.

When the hanger pin apparatus 100 is in the open state (P1), the hook 144 is not attached to the pin 102. That is, the hook 144 and pin 102 are not in intimate contact at a pin-hook interface 146. Accordingly, the first structure 140 is open, relative to the second structure 142, such that the first structure 140 and second structure 142 are not securely latched together. In some examples, the first structure 140 is a fan cowl 158 of an aircraft, and the second structure 142 is a strut 160 of the aircraft. In the open state (P1), the fan cowl 158 is not engaged with the strut 160, such that the fan cowl 158 is separate from the strut 160. Alternatively, the fan cowl 158 is connected to the strut 160 but is open (i.e., not latched), relative to the strut 160. In other examples, the hook assembly 200 setup is reversed, such that the first structure 140 is the strut 160 and the second structure 142 is the fan cowl 158. That is, the hanger pin apparatus 100 is attached to the strut 160 and the hook 144 is attached to the fan cowl 158.

Figure 6:
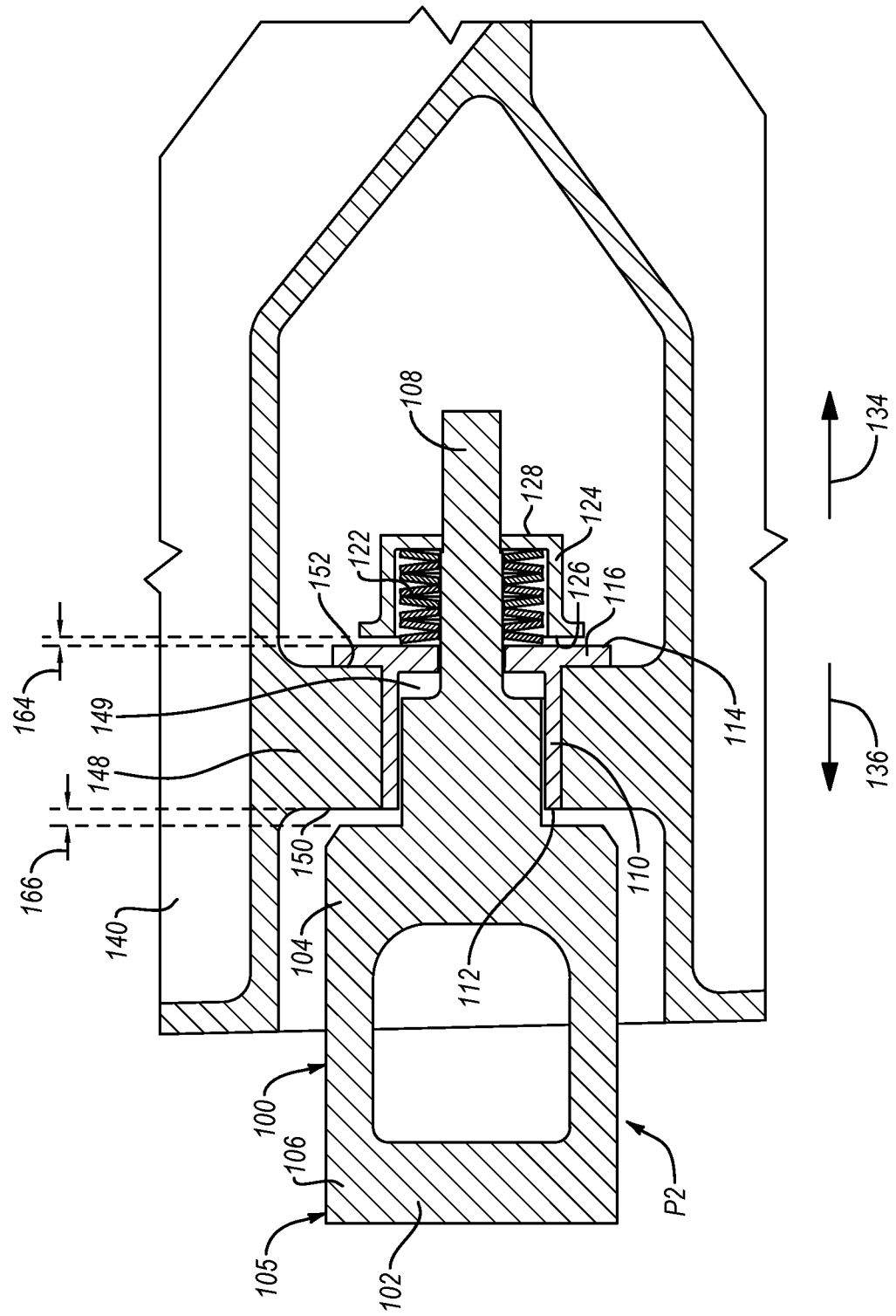
FIG. 6 is a schematic perspective view of a hanger pin apparatus fixed to a first structure, with the hanger pin apparatus in a closed-preloaded state, according to one or more examples of the present disclosure.
Figure 7:
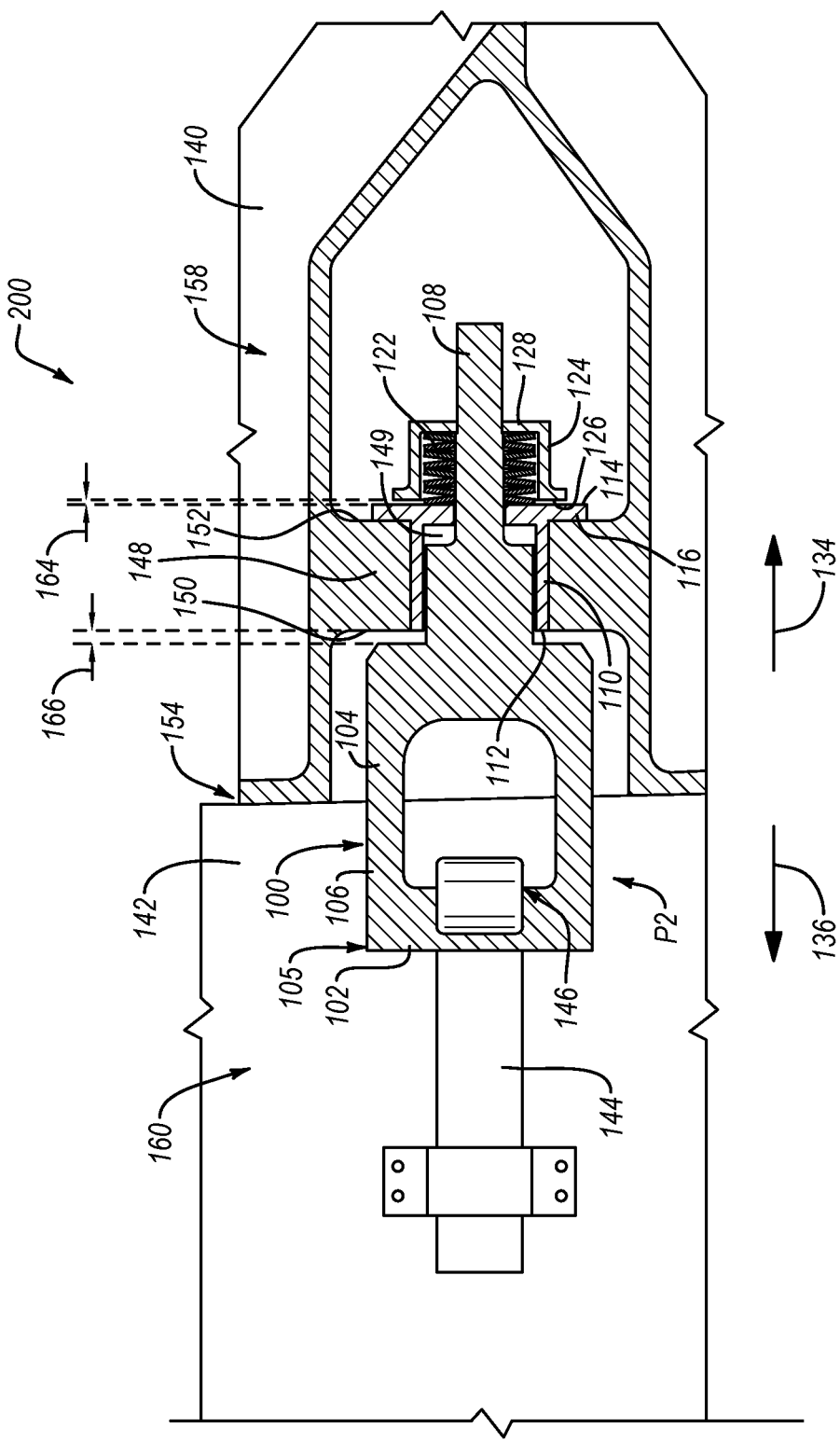
FIG. 7 is a schematic perspective view of a hook assembly, with the hanger pin apparatus of FIG. 6 in a closed-preloaded state, according to one or more examples of the present disclosure.

Referring to FIGS. 6 and 7, the hanger pin apparatus 100 is in a closed-preloaded state (P2). The closed-preloaded state (P2) is a state between the open state (P1) and the closed-loaded state (P3). When in the closed-preloaded state (P2), the spring 122 is applying a spring force in the first direction 134, in addition to, the hook 144 applying a hook force in a second direction 136, which is opposite of the first direction 134. In other words, forces are applied to the keeper 105 of the hanger pin apparatus 100 in opposing directions. The spring force in the first direction 134 forces the bell 124 to move in the first direction 134, which co-moves the keeper 105 in the first direction 134, and the opposing hook force moves the bell 124, which co-moves the keeper 105, in the second direction 136. Accordingly, the keeper 105 can self-adjust (i.e., float), relative to the housing 110, as the spring force and the hook force acting on the keeper 105 are changed. The opposing forces cause the bell 124 to be spaced apart from the second housing end 114 along the rod length (L) of the rod member 108. Additionally, the opposing forces cause the pin-connection member 106 to be spaced apart from the first housing end 112. In other words, a second gap 164 is between the bell 124 and the second housing end 114 and a third gap 166 is between the pin-connection member 106 and the first housing end 112 when the hanger pin apparatus 100 is in the closed-preloaded state (P2). As the hanger pin apparatus 100 does not have any hard stops (i.e., contact points) while in the closed-preloaded state (P2), the keeper 105 can self-adjust, relative to the housing 110, such that a size of the second gap 164 and a size of the third gap 166 is changeable. Accordingly, there is no need for the spring force and the hook force to be in equilibrium. Although the size of the second gap 164 and the size of the third gap 166 is variable, the size of the second gap 164 plus the size of the third gap 166 is equal to the size of the first gap 162, when the hanger pin apparatus 100 is in the open state (P1).

When the hanger pin apparatus 100 is in the closed-preloaded state (P2), the hook 144 is attached to the pin 102. That is, the hook 144 and pin 102 are in intimate contact at the pin-hook interface 146. Accordingly, the first structure 140 is closed, relative to the second structure 142, and the first structure 140 is in a first position 154, relative to the second structure 142. As used herein, the term closed means that a structure is latched or otherwise properly secured with a second structure.

Figure 8:
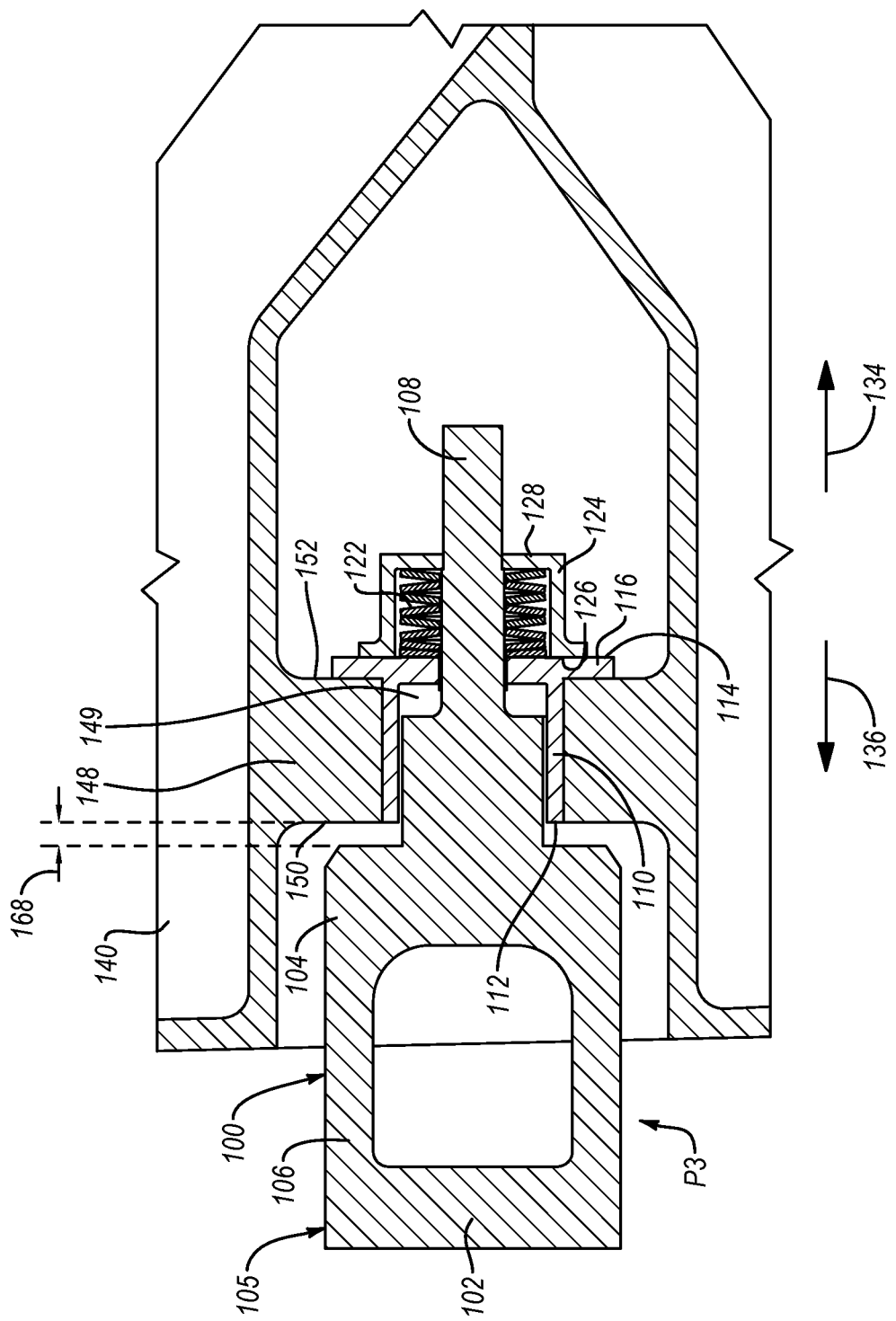
FIG. 8 is a schematic perspective view of a hanger pin apparatus fixed to a first structure, with the hanger pin apparatus in a closed-loaded state, according to one or more examples of the present disclosure.
Figure 9:
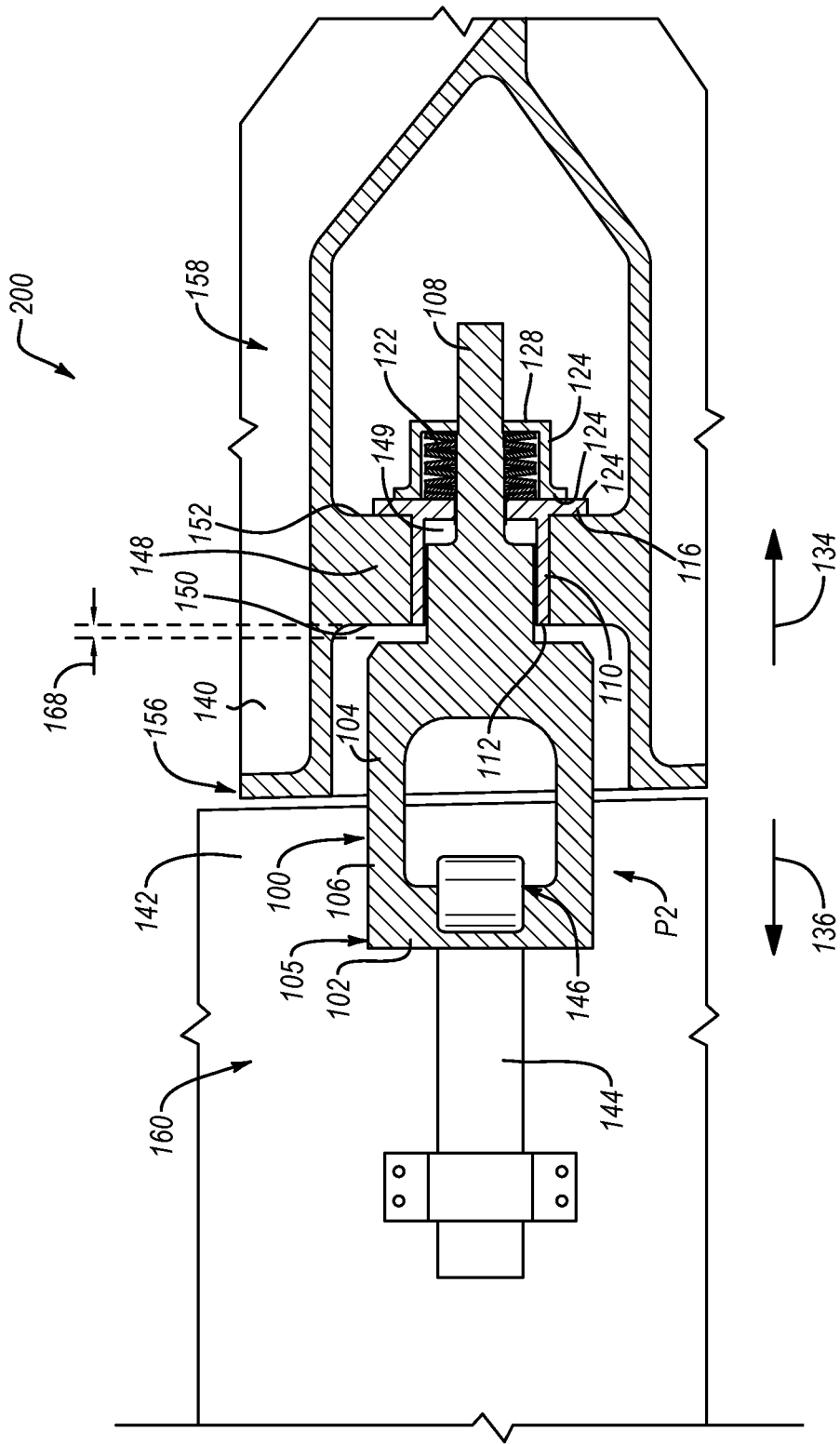
FIG. 9 is a schematic perspective view of a hook assembly, with the hanger pin apparatus of FIG. 8 in a closed-loaded state, according to one or more examples of the present disclosure.

Now referring to FIGS. 8 and 9, the hanger pin apparatus 100 is in a closed-loaded state (P3). When in the closed-loaded state (P3), the hook is applying a hook force in the second direction 136, such that the hook force pulls and/or maintains the pin 102 at its farthest point away from the first structure 140. Accordingly, the hook force is greater than the opposing spring force, such that the spring force is overcome in the closed-loaded state (P3) and the spring 122 compresses until there is contact between the bell 124 and the housing 110. The spring 122 is prevented from over-compressing in the closed-loaded state (P3) by the contact between the bell 124 of the housing 110. The hook force applied in the second direction 136, forces the bell 124 to move in the second direction 136, which co-moves the keeper 105 in the second direction 136, relative to the housing 110. Accordingly, the bell 124 is in contact with the second housing end 114 along the rod length (L) of the rod member 108 of the keeper 105, such that the keeper 105 is prevented from persisting in the second direction 136. In other words, the second housing end 114 provides a hard stop for the bell 124. Additionally, when the hanger pin apparatus 100 is in the closed-loaded state (P3) the pin-connection member 106 is spaced apart from the first housing end 112. Accordingly, a fourth gap 168 is between the pin-connection member 106 and the first housing end 112. The size of the fourth gap 168, when the hanger pin apparatus 100 is in the closed-loaded state (P3) is equal to the size of the first gap 162, when the hanger pin apparatus 100 is in the open state (P1). In some examples, the fourth gap 168 is less than one centimeter. In other examples, the fourth gap 168 is less than five millimeters.

When the hanger pin apparatus 100 is in the closed-loaded state (P3), the hook 144 is attached to the pin 102. That is, the hook 144 and pin 102 and in intimate contact at a pin-hook interface 146 and maintain intimate contact. Accordingly, the first structure 140 is closed, relative to the second structure 142, and the first structure 140 is in a second position 156, relative to the second structure 142. The hook assembly 200 allows the first structure 140 and the second structure 142 to have a more flexible position, relative to each other. That is, the first structure 140 can move between the first position 154 and the second position 156 while maintaining intimate contact at the pin-hook interface 146. This eliminates the need for rigging procedures between the first structure 140 and the second structure 142, as the hanger pin apparatus 100 self-adjusts to overcome tolerance and loading displacement issues between the first structure 140 and the second structure 142. Accordingly, no exterior access panels or additional opening are necessary to access the hanger pin apparatus 100 when the hanger pin apparatus 100 is in a closed state. In some examples, where the hook assembly 200 is in use on an aircraft, the hanger pin apparatus 100 can self-adjust during a flight of the aircraft, as air and wind pressure cause the first structure and second structure to vibrate or otherwise move, relative to each other.

Figure 10:
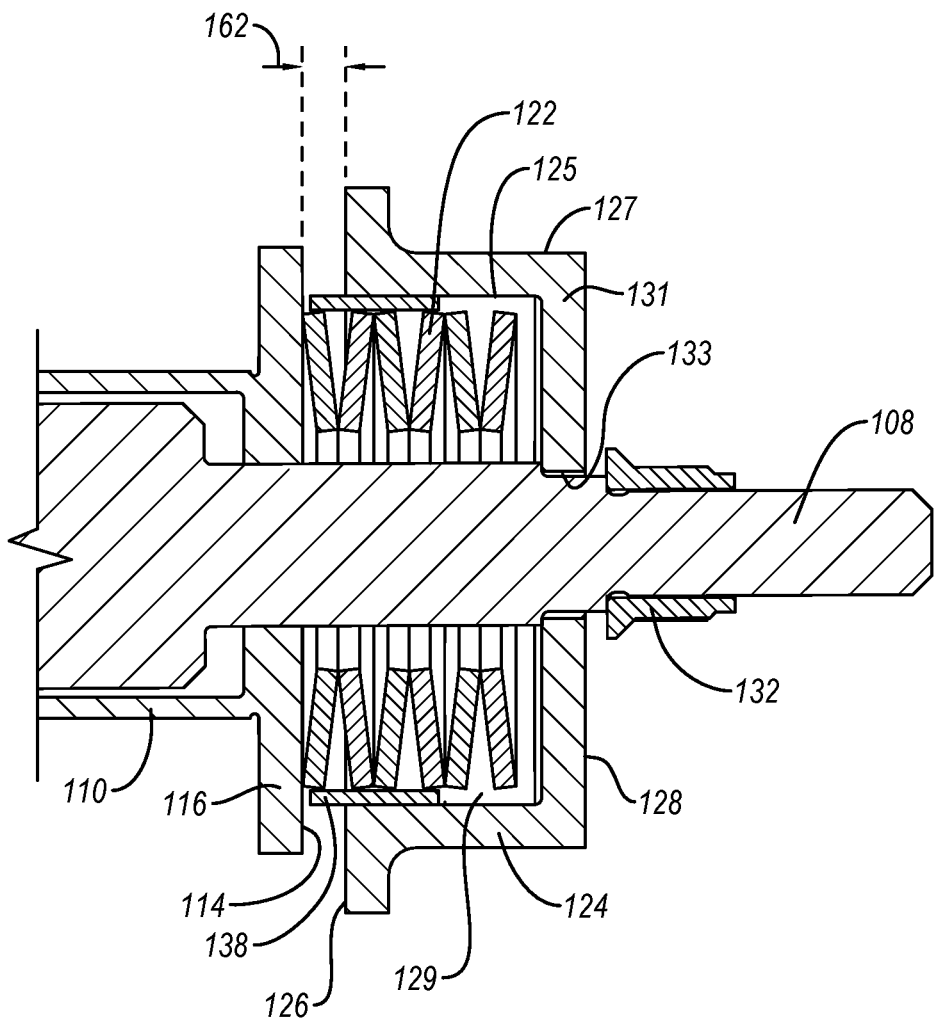
FIG. 10 is a schematic cross-sectional view of a spring and bell of a hanger pin apparatus, according to one or more examples of the present disclosure.

As shown in FIG. 10, in some examples, the hanger pin apparatus 100 includes a spring shielding 138. The spring shielding 138 is configured to shield a gap, such as the first gap 162, between the bell 124 and the housing 110. The spring shielding 138 helps to protect the spring 122 from external elements that could cause damage or corrosion, while still allowing the spring 122 to function effectively. In some examples, the spring shielding 138 is disposed between the bell 124 and the spring 122. That is, the spring shielding 138 is between the bell 124 and the spring 122 such that the spring 122 does not directly contact the inner surface 125 of the bell 124. The spring shielding 138 has a length that is greater than the gap it is configured to shield and less than the length of the inner surface 125.

Figure 11:
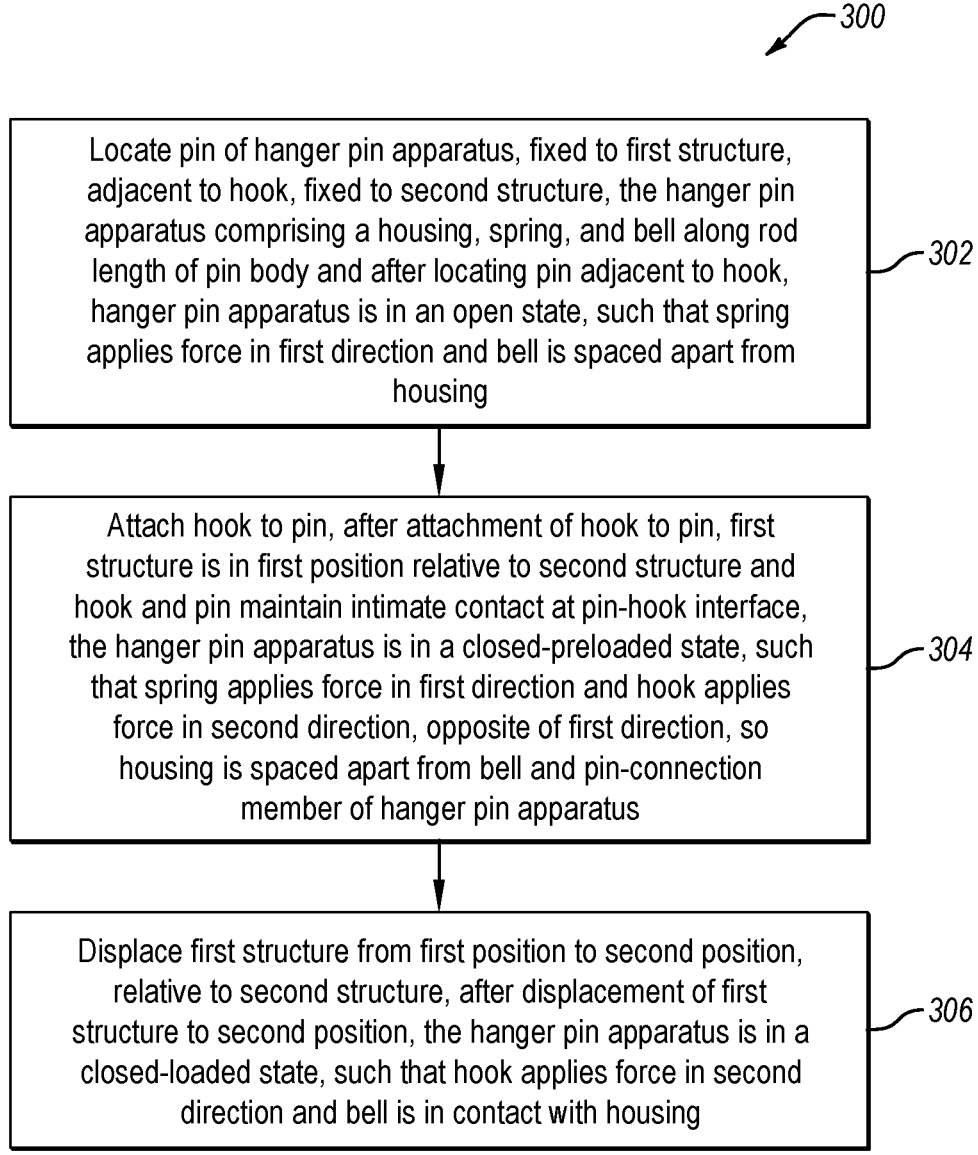
FIG. 11 is a schematic flow diagram of a method of maintaining intimate contact between a pin and a hook at a pin-hook interface, when attached, via a hook assembly, according to one of more examples of the present disclosure.

Referring to FIG. 11, accordingly to some examples, a method 300 of maintaining intimate contact between a pin 102 and a hook 144 at a pin-hook interface 146, when attached, via a hook assembly 200 is shown. The method 300 includes (block 302) locating the pin 102 of a hanger pin apparatus 100 adjacent to the hook 144. The hanger pin apparatus 100 is fixed to a first structure 140 and the hook is fixed to a second structure 142. The hanger pin apparatus 100 includes a housing 110, a spring 122, and a bell 124 along a rod length (L) of a pin body 104. The pin 102, coupled to the pin body 104, is selectively movable, relative to the housing 110 via the spring 122 and the bell 124. When locating the pin 102 adjacent to the hook 144, the hanger pin apparatus 100 is in an open state (P1), such that the spring 122 is applying a spring force in a first direction 134 so that the bell 124 is spaced apart from the housing 110.

The method 300 also includes (block 304) attaching the hook 144 to the pin 102 of the hanger pin apparatus 100. After attachment of the hook 144 and the pin 102, the first structure 140 is in the first position 154 relative to the second structure 142 and the hook 144 and the pin 102 are maintained in intimate contact at the pin-hook interface 146. Accordingly, after attachment of the hook 144 and the pin 102, the hanger pin apparatus 100 is in a closed-preloaded state (P2), such that the spring 122 is applying a spring force in the first direction 134 and the hook 144 is applying a hook force in a second direction 136, opposite of the first direction 134 so that the housing 110 is spaced apart from the bell 124 and a pin-connection member 106 of the hanger pin apparatus 100.

The method 300 further includes (block 306) displacing the first structure 140 from the first position 154 to a second position 156, relative to the second structure 142, while the hook 144 and the pin 102 are maintained in intimate contact at the pin-hook interface 146. After displacement of the first structure 140 to the second position 156, the hanger pin apparatus 100 is in a closed-loaded state (P3), such that the hook 144 is applying a hook force in the second direction 136 so that the bell 124 is in contact with the housing 110.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the examples herein are to be embraced within their scope.

What is claimed is:

1. A hanger pin apparatus for a hook assembly comprising:
    a pin body comprising a unitary structure having a pin-connection member and a rod member that extends axially from the pin-connection member and has a rod length;
    a pin coupled to the pin-connection member of the pin body;
    a housing concentric with the rod member of the pin body along a portion of the rod length and comprising a first housing end, adjacent to the pin-connection member of the pin body, and a second housing end, opposite of the first housing end, wherein the pin body is selectively movable relative to the housing;
    a spring concentric with the rod member of the pin body along a portion of the rod length rearward of the second housing end; and
    a bell concentric with the rod member of the pin body and the spring along a portion of the rod length rearward of the second housing end, wherein the bell at least partially encloses the spring, and the bell is fixed, relative to the pin body, such that the bell co-moves with the pin body relative to the housing;
    wherein:
        the hanger pin apparatus is changeable between, and inclusive of, an open state and a closed-loaded state:
        when in the open state, the spring applies a spring force in a first direction such that the bell is spaced apart from the second housing end along the rod length of the rod member of the pin body; and
        when in the closed-loaded state, a hook force is applied in a second direction, opposite of the first direction, such that the bell is in contact with the second housing end along the rod length of the rod member of the pin body.

2. The hanger pin apparatus of claim 1, wherein the pin and the pin body together form a single unitary construction.

3. The hanger pin apparatus of claim 1, wherein the pin is removably coupled to the pin body such that the pin is removable from the pin body when the hanger pin apparatus is in the open state.

4. The hanger pin apparatus of claim 1, wherein the spring is at least one of a belleville spring, a helical spring, a leaf spring, or a torsional spring.

5. The hanger pin apparatus of claim 1, further comprising a spring shielding disposed between the bell and the spring and configured to shield a gap between the second housing end and the bell when the second housing end is spaced apart from the bell along the rod length of the rod member of the pin body.

6. The hanger pin apparatus of claim 1, wherein the housing comprises an inner surface that is non-circular and configured to prevent the pin body from rotating, relative to the housing.

7. The hanger pin apparatus of claim 1, wherein:
    the hanger pin apparatus is further changeable into a closed-preloaded state between the open state and the closed-loaded state; and
    when in the closed-preloaded state, the spring applies a spring force in the first direction and a hook force is applied in the second direction, opposite of the first direction, such that the bell is spaced apart from the second housing end along the rod length of the rod member of the pin body and the pin-connection member of the pin body is spaced apart from the first housing end.

8. The hanger pin apparatus of claim 1, further comprising a stopper concentric with and fixed to the rod member of the pin body along a portion of the rod length rearward of the bell, wherein the stopper is configured to prevent the bell from moving, relative to the rod member of the pin body.

9. The hanger pin apparatus of claim 1, wherein the second housing end comprises a flange extending radially outward from an outer surface of the housing.

10. The hanger pin apparatus of claim 1, wherein a thickness of the rod member of the pin body varies along the rod length of the rod member.

11. The hanger pin apparatus of claim 1, wherein the housing is fixable within a housing support of a structure.

12. A hook assembly comprising:
    a hanger pin apparatus fixed to a first structure, the hanger pin apparatus comprising:
        a pin body comprising a unitary structure having a pin-connection member and a rod member that extends axially from the pin-connection member and has a rod length;
        a pin coupled to the pin-connection member of the pin body;
        a housing concentric with the rod member of the pin body along a portion of the rod length and comprising a first housing end, adjacent to the pin-connection member of the pin body, and a second housing end, opposite of the first housing end, wherein the pin body is selectively movable relative to the housing;
        a spring concentric with the rod member of the pin body along a portion of the rod length rearward of the second housing end; and
        a bell concentric with the rod member of the pin body and the spring along a portion of the rod length rearward of the second housing end, wherein the bell at least partially encloses the spring, and the bell is fixed, relative to the pin body, such that the bell co-moves with the pin body, relative to the housing;
        wherein:
            the hanger pin apparatus is changeable between, and inclusive of, an open state and a closed-loaded state;
            when in the open state, the spring applies a spring force in a first direction such that the bell is spaced apart from the second housing end along the rod length of the rod member of the pin body; and
            when in the closed-loaded state, a hook force is applied in a second direction, opposite of the first direction, such that the bell is in contact with the second housing end along the rod length of the rod member of the pin body; and a hook fixed to a second structure and configured to be removably attachable to the pin;

wherein, when the hook is attached to the pin, the hook and the pin maintain intimate contact at a pin-hook interface.

13. The hook assembly of claim 12, wherein the first structure further comprises a housing support configured to prevent the housing from moving, relative to the pin body.

14. The hook assembly of claim 13, wherein:

the housing support comprises a first support end and a second support end spaced apart from the first support end;

the first housing end is laterally aligned with the first support end;

the second housing end comprises a flange extending radially outward from an outer surface of the housing; and the flange extends beyond and abuts against the second support end.

15. The hook assembly of claim 12, wherein, when the hanger pin apparatus is in the open state, the hook is not attached to the pin.

16. The hook assembly of claim 12, wherein, when the hanger pin apparatus is in the closed-loaded state, the hook is attached to the pin and the first structure is in a second position, relative to the second structure.

17. The hook assembly of claim 12, wherein:

the hanger pin apparatus is changeable into a closed-preloaded state between the open state and the closed-loaded state; and when the hanger pin apparatus is in the closed-preloaded state, the spring applies a spring force in the first direction and the hook applies a hook force in the second direction, opposite of the first direction such that the bell is spaced apart from the second housing end along the rod length of the rod member of the pin body and the pin-connection member of the pin body is spaced apart from the first housing end.

18. The hook assembly of claim 17, wherein when the hanger pin apparatus is in the closed-preloaded state, the hook is attached to the pin and the first structure is in a first position, relative to the second structure.

19. The hook assembly of claim 12, wherein:

the first structure is a fan cowl of an aircraft; and the second structure is a strut of the aircraft.

20. A method of maintaining intimate contact between a pin and a hook at a pin-hook interface, when attached, via a hook assembly, the method comprising:

locating the pin of a hanger pin apparatus, fixed to a first structure, adjacent to the hook, fixed to a second structure, the hanger pin apparatus comprising a housing, a spring and a bell along a rod length of a pin body comprising a unitary structure having a pin-connection member and a rod member that extends axially from the pin-connection member, wherein the pin, coupled to the pin body, is selectively movable, relative to the housing via the spring and the bell, and wherein, when locating the pin adjacent to the hook, the hanger pin apparatus is in an open state, such that the spring is applying a spring force in a first direction so that the bell is spaced apart from the housing;

attaching the hook to the pin of the hanger pin apparatus, wherein, after attachment of the hook and the pin, the first structure is in a first position relative to the second structure and the hook and the pin are maintained in intimate contact at the pin-hook interface, and wherein, after attachment of the hook and the pin, the hanger pin apparatus is in a closed-preloaded state, such that the spring is applying a spring force in the first direction and the hook is applying a hook force in a second direction, opposite of the first direction so that the housing is spaced apart from the bell and a pin-connection member of the hanger pin apparatus; and displacing the first structure from the first position to a second position, relative to the second structure while the hook and the pin are maintained in intimate contact at the pin-hook interface, wherein, after displacement of the first structure to the second position, the hanger pin apparatus is in a closed-loaded state, such that the hook is applying a hook force in the second direction so that the bell is in contact with the housing.

* * * * *